United States Patent
Rock et al.

(10) Patent No.: US 8,329,347 B2
(45) Date of Patent: Dec. 11, 2012

(54) FUEL CELL WITH MICROTRUSS WATER VAPOR TRANSPORT DEVICE

(75) Inventors: Jeffrey A. Rock, Fairport, NY (US); Yeh-Hung Lai, Webster, NY (US); Gerald W. Fly, Geneseo, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 335 days.

(21) Appl. No.: 12/701,892

(22) Filed: Feb. 8, 2010

(65) Prior Publication Data

US 2011/0195337 A1   Aug. 11, 2011

(51) Int. Cl.
  *H01M 8/04* (2006.01)
  *B01D 47/00* (2006.01)
  *G11B 7/0045* (2006.01)

(52) U.S. Cl. ........ 429/413; 429/450; 429/414; 261/100; 430/270.14

(58) Field of Classification Search .................. None
See application file for complete search history.

(56) References Cited

U.S. PATENT DOCUMENTS

| | | | |
|---|---|---|---|
| 6,274,288 B1 | 8/2001 | Kewitsch et al. | |
| 6,471,195 B2 | 10/2002 | Shimanuki et al. | |
| 7,036,466 B2 | 5/2006 | Goebel et al. | |
| 7,156,379 B2 | 1/2007 | Tanihara et al. | |
| 7,382,959 B1 * | 6/2008 | Jacobsen | 385/129 |
| 7,875,396 B2 * | 1/2011 | Zhang et al. | 429/413 |
| 2001/0041281 A1 * | 11/2001 | Wilkinson et al. | 429/34 |
| 2005/0260469 A1 | 11/2005 | Forte | |
| 2006/0029837 A1 | 2/2006 | Sennoun et al. | |
| 2008/0001313 A1 | 1/2008 | Zhang et al. | |
| 2009/0053565 A1 * | 2/2009 | Iacovelli | 429/15 |
| 2010/0291465 A1 * | 11/2010 | Rock et al. | 429/483 |
| 2011/0039190 A1 * | 2/2011 | Owejan et al. | 429/518 |

FOREIGN PATENT DOCUMENTS

DE 102010035360 A1 4/2011

OTHER PUBLICATIONS

ACTA Materialia 55 (2007 6724-6733); Science Direct; Compression behavior of micro-scale truss structures formed from self-propagating polymer waveguides; Alan J. Jacobsen, William Barvosa-Carter, Steven Nutt; www.sciencedirect.com.

(Continued)

*Primary Examiner* — Keith Walker
(74) *Attorney, Agent, or Firm* — Fraser Clemens Martin & Miller LLC; J. Douglas Miller (57) ABSTRACT

A fuel cell system includes a water vapor transport device having a wet flow field layer having a coarse microtruss structure disposed between a pair of fine microtruss structures. The coarse and fine microtruss structures of the wet flow field layer are formed from a radiation-sensitive material. A dry flow field layer has a coarse microtruss structure disposed between a pair of fine microtruss structures. The coarse and fine microtruss structures of the dry flow field layer are also formed from a radiation-sensitive material. A membrane is disposed between the wet flow field layer and the dry flow field layer and adapted to permit a transfer of water vapor therethrough from the wet fluid to the dry fluid to form a humidified fluid.

13 Claims, 3 Drawing Sheets

OTHER PUBLICATIONS

ACTA Materialia xxx (2008); Science Direct; Shear behavior of polymer micro-scale truss structures formed from self-propagating polymer waveguides; Alan J. Jacobsen, William Barvosa-Carter, Steven Nutt; www.sciencedirect.com.

Transactions of the ASME; Layered Manufacturing: Current Status and Future Trends; vol. Mar. 1, 2001, Copyright 2001; Dutta, Prinz, Rosen, Weiss.

Advanced Materials 2007; Micro-scale Truss Structures formed from Self-Propagating Photopolymer Waveguides; Alan J. Jacobsen, William Barvosa-Carter, Steven Nutt; Wiley InterScience.

Elsevier Editorial System(tm) for Acta Materialia (Manuscript Draft No. A-07-1792R2); Micro-scale truss structures with three-fold and six-fold symmetry formed from self-propagating polymer waveguides; Alan J. Jacobsen, William Barvosa-Carter, Steven Nutt.

* cited by examiner

FUEL CELL WITH MICROTRUSS WATER VAPOR TRANSPORT DEVICE

FIELD OF THE INVENTION

The present disclosure relates to a fuel cell component and more particularly to a water vapor transport device manufactured by photopolymerization.

BACKGROUND OF THE INVENTION

A fuel cell has been proposed as a clean, efficient and environmentally responsible power source for electric vehicles and various other applications. Individual fuel cells can be stacked together in series to form a fuel cell stack for various applications. The fuel cell stack is capable of supplying a quantity of electricity sufficient to power a vehicle. In particular, the fuel cell stack has been identified as a potential alternative for the traditional internal-combustion engine used in modern automobiles.

One type of fuel cell is the polymer electrolyte membrane (PEM) fuel cell. The PEM fuel cell includes three basic components: an electrolyte membrane; and a pair of electrodes, including a cathode and an anode. The electrolyte membrane is sandwiched between the electrodes to form a membrane-electrode-assembly (MEA). The MEA is typically disposed between porous diffusion media (DM) such as carbon fiber paper, which facilitates a delivery of reactants such as hydrogen to the anode and oxygen to the cathode. In the electrochemical fuel cell reaction, the hydrogen is catalytically oxidized in the anode to generate free protons and electrons. The protons pass through the electrolyte to the cathode. The electrons from the anode cannot pass through the electrolyte membrane, and are instead directed as an electric current to the cathode through an electrical load such as an electric motor. The protons react with the oxygen and the electrons in the cathode to generate water.

As is well understood in the art, the membranes within the fuel cell stack must have a certain relative humidity (RH) for efficient performance. Measures are often taken to maintain the membrane hydration within a desired range that optimizes proton conduction across the electrolyte membranes. In a common approach, at least one of the reactants is directed to a membrane humidifier or water vapor transport (WVT) device before they are directed to the fuel cell. For example, humidification of the fuel cell is discussed in commonly owned U.S. Pat. No. 7,036,466 to Goebel et al., commonly owned U.S. Pat. Appl. Pub. No. 2006/0029837 to Sennoun et al., and commonly owned U.S. Pat. Appl. Pub. No. 2005/0260469 to Forte, each of which is hereby incorporated herein by reference in its entirety. WVT devices are commonly used to humidify air directed to the cathodes of the fuel cell stack. Examples of air humidifiers are shown and described in U.S. Pat. No. 7,156,379 to Tanihara et al., hereby incorporated herein by reference in its entirety, and U.S. Pat. No. 6,471,195 to Shimanuki et al., hereby incorporated herein by reference in its entirety. The WVT device may be either external to the fuel cell stack or may be formed within the fuel cell stack.

A typical membrane humidifier-type WVT device is disclosed in commonly owned U.S. Pat. Appl. Pub. No. 2008/0001313 to Zhang et al., hereby incorporated herein by reference in its entirety. The membrane humidifier includes a substantially planar first plate having at least one substantially linear flow channel formed therein, and a substantially planar second plate having at least one substantially linear flow channel formed therein. The flow channels of the first and second plates facilitate a flow of a first and second gas therethrough, respectively. A diffusion medium is disposed between the first plate and the second plate and is adapted to permit a transfer of water vapor therethrough. A membrane is also disposed between the first plate and the second plate and is adapted to permit a transfer of water vapor therethrough. The water vapor in the first gas is transferred through the diffusion medium and the membrane to the second gas.

There is a continuing need for a fuel cell system with a water vapor transport device that maintains mechanical strength and stability in relation to creep, thermal expansion, and hydro expansion of the membrane of the water vapor transport device. Desirably, the water vapor transport device exhibits through-plane stiffness sufficient to absorb membrane expansion during operation of the water vapor transport device.

SUMMARY OF THE INVENTION

In concordance with the instant disclosure, a fuel cell system with a water vapor transport device that maintains mechanical strength and stability in relation to creep, thermal expansion, and hydro expansion of the membrane, and exhibits through-plane stiffness sufficient to absorb membrane expansion during operation of the water vapor transport device, is surprisingly discovered.

In one embodiment, a fuel cell system includes a fuel cell having an electrolyte membrane disposed between a pair of electrodes, a pair of diffusion medium layers, and a pair of electrically conductive fuel cell plates. The electrodes are configured to receive the humidified fluid from a water vapor transport device in fluid communication therewith. The water vapor transport device includes a wet flow field layer having a coarse microtruss structure disposed between a pair of fine microtruss structures. The coarse and fine microtruss structures of the wet flow field layer are formed from a radiation-sensitive material and adapted to facilitate a flow of a wet fluid therethrough. A dry flow field layer has a coarse microtruss structure disposed between a pair of fine microtruss structures. The coarse and fine microtruss structures of the dry flow field layer are formed from a radiation-sensitive material and adapted to facilitate a flow of a dry fluid therethrough. A membrane is disposed between the wet flow field layer and the dry flow field layer. The membrane is adapted to permit a transfer of water vapor therethrough from the wet fluid to the dry fluid to form a humidified fluid.

DRAWINGS

The above, as well as other advantages of the present disclosure, will become readily apparent to those skilled in the art from the following detailed description, particularly when considered in the light of the drawings described herein.

DETAILED DESCRIPTION OF THE INVENTION

The following detailed description and appended drawings describe and illustrate various embodiments of the invention.

The description and drawings serve to enable one skilled in the art to make and use the invention, and are not intended to limit the scope of the invention in any manner.

Figure 1:
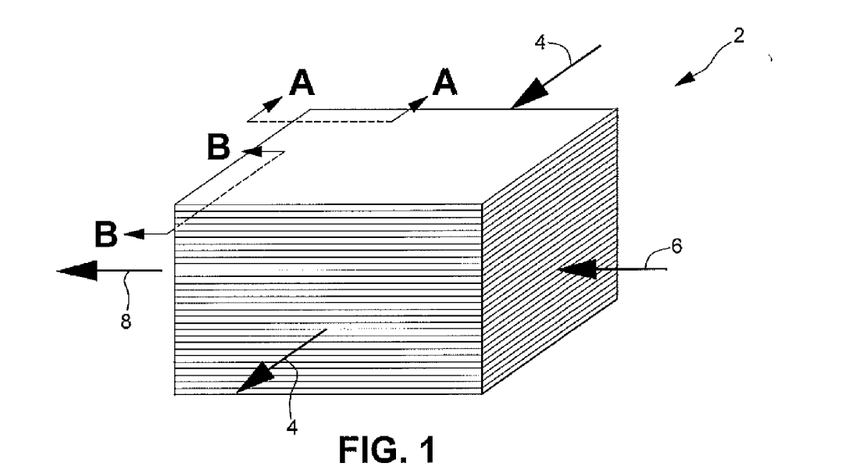
FIG. 1 is a schematic perspective view of a water vapor transport device according to the present disclosure.

As shown in FIG. 1, the present disclosure includes a fuel cell system having a water vapor transport device 2 configured to receive a flow of a wet fluid 4 and a flow of a dry fluid 6. The wet fluid 4 may include any fluid that has a quantity of water, typically in the form of water vapor, present therein. For example, the wet fluid 4 may include humidified air. The dry fluid 6 may include any fluid that has a quantity of water less than that present in the wet fluid 4. The water vapor transport device 2 is further configured to transfer water vapor from the wet fluid 4 to the dry fluid 6 and form a flow of a humidified fluid 8. The water vapor transport device 2 is in fluid communication with a fuel cell (not shown) and configured to provide a humidified reactant thereto. For example, the water vapor transport device 2 may provide at least one of a humidified flow of air to a cathode and a humidified flow of hydrogen to an anode of the fuel cell. Other humidification and dehumidification methods using the water vapor transport device 2 are also within the scope of the present disclosure.

Figure 2A:
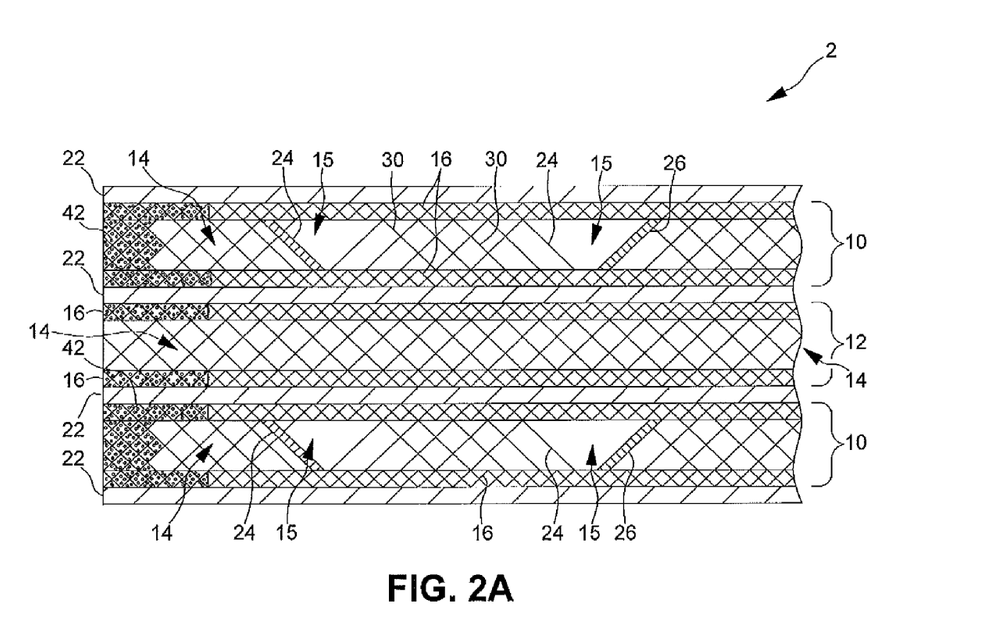
FIGS. 2A-2B are fragmentary side cross-sectional elevational views of a water vapor transport device taken along section lines A-A and B-B, respectively, in FIG. 1, showing a single dry flow field between a pair of wet flow fields for purposes of illustration.
Figure 2B:
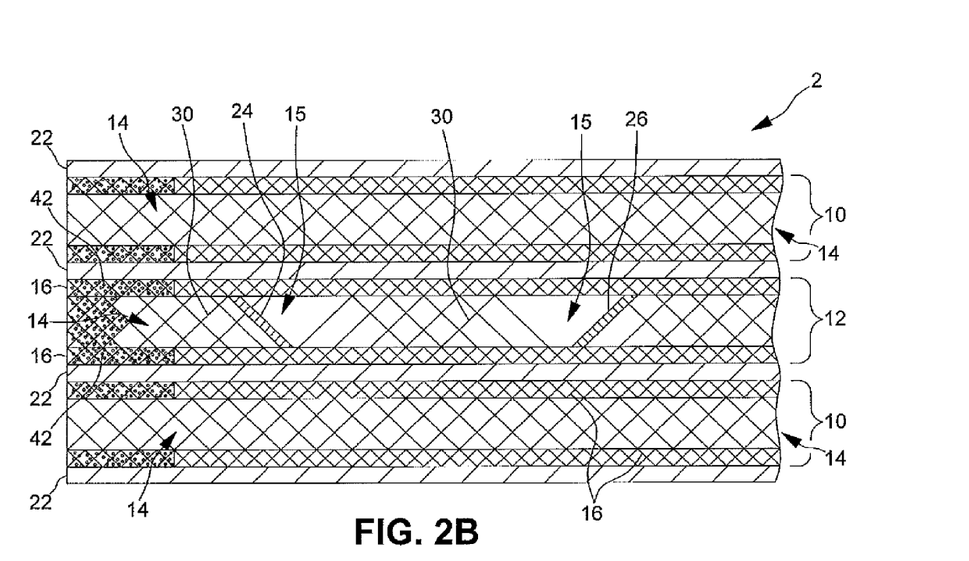

Referring now to FIGS. 2A-2B, the water vapor transport device 2 according to one embodiment of the disclosure is shown. The water vapor transport device 2 includes at least one wet flow field layer 10 and at least one dry flow field layer 12. The wet flow field layer 10 is configured to be in fluid communication with the flow of the wet fluid 4. The dry flow field layer 12 is configured to be in fluid communication with the flow of the dry fluid 6. For purpose of simplicity, a pair of wet flow field layers 10 is shown in FIGS. 2A-2B and 3A-3B with a single dry flow field layer 12 disposed therebetween. However, it should be appreciated that the water vapor transport device 2 having a plurality of the wet flow field layers 10 and a plurality of the dry flow field layers 12, for example, alternately arranged in a stack, may also be employed within the scope of the present disclosure.

The wet flow field layer 10 includes a coarse microtruss structure 14 disposed between a pair of fine microtruss structures 16. The structures of the wet flow field layer 10 are formed from a radiation-sensitive material and configured to facilitate the flow of the wet fluid 4 therethrough. Likewise, the dry flow field layer 12 includes a coarse microtruss structure 14 disposed between a pair of fine microtruss structures 16. The structures of the dry flow field layer 12 are also formed from a radiation-sensitive material and configured to facilitate the flow of the dry fluid 6 therethrough.

The coarse microtruss structure 14 has a pore size configured to facilitate the flow of fluid therethrough and to support the fine microtruss structures 16. The coarse microtruss structure 14 has an average pore size of greater than about 250 microns, and particularly greater than about 500 microns. The fine microtruss structure 16 has a pore size configured to support a membrane 22. The pore size of the fine microtruss structure 16 may also be selected to facilitate a wicking of fluid, such as water. The fine microtruss structure has an average pore size of less than about 250 microns, and particularly less than about 100 microns.

At least one of the wet and dry flow field layers 10, 12 may further include a plurality of flow channels 15. It should be understood that the respective flow channels 15 of the wet and dry flow field layers 10, 12 may be disposed cross-flow or counter-flow in relation to one another, for example, non-parallel to one another, as desired. For example, the wet flow field layer 10 may be configured to direct the flow of the wet fluid 4 in a first direction and the dry flow field layer 12 may be configured to direct the flow of the dry fluid 6 in a second direction, wherein the first direction is different from the second direction. A spatial density of the coarse microtruss structure 14 can be adjusted to provide the flow channels 15 for directing the fluid flow and discharge of water droplets in the water vapor transport device 2, while also providing substantially open areas for minimizing total pressure drop across the water vapor transport device 2. For example, the flow channels 15 may be formed by an absence of trusses in the coarse microtruss structure 14. In a further embodiment, the flow channels 15 are formed by a plurality of channel walls, as described further herein.

The formation of radiation-cured structures such as the wet and dry flow field layers 10, 12, the coarse microtruss structures 14, and the fine microtruss structures 16, are described in Assignee's co-pending U.S. patent application Ser. No. 12/339,308, the entire disclosure of which is hereby incorporated herein by reference. In particular, radiation-cured microtruss structures are described by Jacobsen et al. in "Compression behavior of micro-scale truss structures formed from self-propagating polymer waveguides", Acta Materialia 55, (2007) 6724-6733, the entire disclosure of which is hereby incorporated herein by reference. One particular method and system of creating radiation-cured structures is disclosed by Jacobsen in U.S. Pat. No. 7,382,959, the entire disclosure of which is hereby incorporated herein by reference. The system includes at least one collimated light source selected to produce a collimated light beam; a reservoir having a photo-monomer adapted to polymerize by the collimated light beam; and a mask having at least one aperture and positioned between the at least one collimated light source and the reservoir. The at least one aperture guides a portion of the collimated light beam into the photo-monomer to form the at least one polymer waveguide through a portion of a volume of the photo-monomer. Further radiation-cured structures are disclosed by Jacobsen in U.S. patent application Ser. No. 11/801,908, the entire disclosure of which is hereby incorporated herein by reference. A polymer material that is exposed to radiation and results in a self-focusing or self-trapping of light by formation of polymer waveguides is also described by Kewitsch et al. in U.S. Pat. No. 6,274,288, the entire disclosure of which is hereby incorporated herein by reference.

The radiation-cured wet and dry flow field layers 10, 12 are formed from radiation-sensitive materials. The radiation sensitive materials according to the present disclosure include radiation-curable materials and radiation-dissociable materials. The term "radiation-curable material" is defined herein as any material that is at least one of initiated, polymerized, and crosslinked by exposure to radiation. It should be appreciated that an increase in temperature may also be employed to at least partially complete polymerization or crosslinking of the radiation-curable materials following an initiation by the exposure to radiation. The term "radiation-dissociable material" is defined herein as any material that exhibits at least one of a scissioning of the polymer backbone and a decrosslinking by exposure to radiation. As a nonlimiting example, the radiation-dissociable material may be made solvent-soluble by a sufficient breakage of crosslinks and/or scissioning of the polymer backbone of the radiation-dissociable material.

As nonlimiting examples, the radiation-curable materials may include one of a liquid photomonomer and a substantially solid radiation-curable polymer. The liquid photomonomer may be a monomer as described by Jacobsen in U.S. Pat. No. 7,382,959 and U.S. application Ser. No. 11/801, 908. Further nonlimiting examples of suitable photomonomers include monomers that polymerize via free-radical polymerization when exposed to UV radiation (e.g., wavelength between about 250 nm and about 400 nm). The photomonomer may include any suitable free-radical photopolymer material such as urethanes (polyurethanes), acrylates, methacrylates, and cationic polymers such as photo-cured epoxies. Suitable liquid photomonomers may exhibit a shift in index of refraction upon photopolymerization, for example, to provide self-propagating waveguides. Other photomonomers may also be employed, as desired.

Suitable substantially solid radiation-curable polymers may include negative resist polymers. Negative resist polymers go through a photoinitiation process that leads to a curing of the negative resist polymer by polymerization or polycondensation, for example. Where the polymerization or polycondensation reaction occurs at substantially the same time, the process is referred to as "photocured". Where only the reaction species are generated by the photoinitiation process and a subsequent step such a heating is required to generate the polymerization or polycondensation, the process is be referred to as "photoinitiated". It should be appreciated that even though a post-cure heat treatment may be necessary to finalize the polymerization step, substantially stable radiation-cured features in the negative photoresist polymer may also be created during the initial radiation exposure. The substantially solid radiation-curable polymers can go through just the initiation process and, due to inherent stability and the limited diffusion rate of the chemical species within the solid radiation-curable polymers, the curing process may also be performed much later without significant feature degradation. It should be appreciated that most photoinitiated polymers begin the curing process at the inception of the initiation process, but the kinetics of the reaction at the exposure temperature are so slow that little, if any, polymerization or polycondensation may take place prior to heating the negative resist polymer to a desired curing temperature.

One particular negative resist polymer is the epoxy-based SU-8 2000™ negative resist polymer, commercially available from Microchem Corporation in Newton, Mass. The SU-8 2000™ negative resist polymer is curable by UV radiation. It should be appreciated that other substantially solid radiation-curable polymers may be employed.

As a nonlimiting example, the radiation-dissociable materials may include positive resist polymers. Positive resist polymers begin as crosslinked polymers but may contain photoinitiators that, when exposed to a particular radiation, generate chemical species which dissociate the polymer by at least one of breaking the crosslinks and scissioning the polymer backbone. The dissociation makes the positive resist polymer soluble in the regions which have been exposed to the radiation. Regions where the positive resist polymer remains non-dissociated are masked rather than being exposed, as is the case with the negative resist polymers described hereinabove. In certain embodiments, the positive resist polymers are sensitive to radiation, e.g., ultraviolet or electron beam, without the need for photoinitiators. For example, the positive resist polymer may itself be damaged by the radiation and the remaining scissioned chains become soluble in a solvent. Other types of positive resist polymers may be employed, as desired.

The flow channels 15 of at least one of the wet flow field layer 10 and the dry flow field layer 12 may include a plurality of first channel walls 24 extending along one direction. The first channel walls 24 may extend along a length of at least one of the wet and dry flow field layers 10, 12. The flow channels 15 may further include a plurality of second channel walls 26, also extending along the length of the at least one of the wet and dry flow field layers 10, 12. The first and second channel walls 24, 26 may be spaced apart as shown in FIGS. 2A to 3B.

In an alternate embodiment, the first and second channel walls 24, 26 interpenetrate each other at a plurality of junctions (not shown). As a nonlimiting example, the first and second channel walls 24, 26 may form substantially V-shaped flow channels 15. It should be appreciated that forming the flow channels 15 as open V-shapes may allow recovery of excess radiation-sensitive materials used during manufacture of the wet and dry flow field layers 10,12, for example. The junctions may be disposed adjacent either of the fine microtruss structures 16 sandwiching the flow channels 15, as desired.

The wet and dry flow field layers 10, 12 may further include a plurality of spaced apart support ligaments 30 that facilitate the flows of the wet and dry fluids 4, 6, respectively, though the wet and dry flow field layers 10, 12 and militate against an undesirable flexing of the first and second channel walls 24, 26 under typical fuel cell operating conditions. Like truss elements forming the microtruss structure 16, as described further herein, the support ligaments 30 may have an elliptical cross-sectional shape or other cross-sectional shape as desired. It should be understood that the support ligaments 30 may have a cross-sectional area greater than a cross-sectional area of the surrounding truss elements, however, to facilitate a support of the first and second channel walls 24, 26.

The support ligaments 30 may also intersect, continuously or intermittently, as desired. For example, the support ligaments 30 may be disposed between at least one of the first and second channel walls 24, 26 and at least one of the fine microtruss structures 16. The support ligaments 30 may also be disposed between the fine microtruss structures 16. At least one of the support ligaments 30 may intersect another of the support ligaments 30 adjacent the fine microtruss structures 16. In particular, the support ligaments 30 may be designed to intersect adjacent the fine microtruss structures 16 for rigidity and to avoid undesirable flexing and cracking of the first and second channel walls 24, 26. In another example, a spatial density of the support ligaments 30 may be less than a spatial density of the adjacent fine microtruss structures 16. It should be appreciated that the spatial density of the fine microtruss structures 16 of the wet and dry flow field layers 10, 12 may be maximized to provide a substantially even support of the membrane 22 disposed therebetween.

In particular embodiments, at least one of the wet and dry flow field layers 10, 12 may have a thickness of up to about 5.0 mm, particularly up to about 2.0 mm, and most particularly up to about 1.0 mm. In certain examples, the thickness of at least one of the wet and dry flow field layers 10, 12 may be between about 0.05 mm and 1.0 mm. Other suitable thicknesses of the wet and dry flow field layers 10, 12 may also be selected.

The membrane 22 is disposed between the wet flow field layer 10 and the dry flow field layer 12. For example, the membrane 22 may be provided as a separate layer disposed between the wet and dry flow field layers 10, 12. In another example, the membrane 22 is formed of a material imbibed by the fine microtruss structure 16 of at least one of the wet and dry flow field layers 10, 12. The membrane 22 permits a transfer of water vapor therethrough from the wet fluid 6 to the dry fluid 4 to form the humidified fluid 8. In certain embodiments, the membrane 22 has a thickness from about 10 microns to about 100 microns, more particularly from about 25 microns to about 75 microns, and most particularly about 50 microns. As nonlimiting examples, the material forming the membrane 22 may include perfluorosulfonic acid polymer (PFSA), cellulose, chitosan (CS), polyamide, polyacrylamide (PAM), polyarylate, polyacrylonitrile (PAN), polybenzlmidazole (PBI), polyetherimide (PEI), polyethersulfone (PES), polyimide (PI), polyphenylsulfone (PPSU), polystyrene, polysulfone (PS), polyurethane, poly(vinyl alcohol) (PVA), sodium alginate (SA), sulfonated polyetheretherketone (SPEEK), and combinations and mixtures thereof. The various materials suitable for forming the membrane 22 may swell upon exposure to water moisture. For example, materials for the membrane 22 may exhibit from about 0% volumetric swelling up to about 300% volumetric swelling, during operation of the water vapor transport device 2. One of ordinary skill in the art may select suitable thicknesses and materials for the membrane 22, as desired.

Each of the coarse and fine microtruss structures 14, 16 of the present disclosure include a plurality of first truss elements extending along a first direction, a plurality of second truss elements extending along a second direction, and a plurality of third truss elements extending along a third direction. The first, second, and third truss elements may interpenetrate each other at a plurality of nodes. It should be appreciated that the first, second, and third truss elements may not interpenetrate each other, or may interpenetrate each other at the plurality of nodes on an intermittent basis, as desired. The first, second, and third truss elements form a continuous, three dimensional, self supporting cellular structure.

Although the coarse and fine microtruss structures 14, 16 with the plurality of first truss elements, the plurality of second truss elements, and the plurality of third truss elements may have a 3-fold architectural symmetry as described hereinabove, a skilled artisan should appreciate that other architectures for the coarse and fine microtruss structure 16, such as a 4-fold symmetry and a 6-fold symmetry, may be employed within the scope of the present disclosure. The particular architecture may be selected, for example, to maximize the coarse and fine microtruss structures 14, 16 connectivity and minimize susceptibility to bending and buckling of the coarse and fine microtruss structures 14, 16 under a load. The selected architecture may be symmetrical or asymmetrical, as desired. The architecture may also be selected to optimize strength and stiffness of the coarse and fine microtruss structures 14, 16. One of ordinary skill in the art should further understand that the other architectures for the coarse and fine microtruss structures 14, 16 may be employed, as desired.

Exemplary architectures of the coarse and fine microtruss structures 14, 16 are described by Jacobsen in U.S. Pat. No. 7,382,959 and U.S. patent application Ser. No. 11/801,908. For example, the plurality of first truss elements may be defined by a plurality of first self-propagating polymer truss waveguides. The plurality of second truss elements may be defined by a plurality of second self-propagating polymer truss waveguides. The plurality of third truss elements may be defined by a plurality of third self-propagating polymer truss waveguides. Other suitable means of forming the coarse and fine microtruss structures 14, 16 may be employed as desired.

One of ordinary skill in the art should appreciate that the particular coarse and fine microtruss structures 14, 16 can be designed as desired, for example, by at least one of: 1) selecting the angles and the patterns of the polymer truss elements with respect to one another, 2) adjusting the packing, or relative density of the resulting cellular structure, and 3) selecting the cross-sectional shapes and dimensions of the polymer truss elements. In particular, polymer truss elements having an elliptical truss cross-sectional shape may militate against degradation with differences in coefficient of thermal expansion. Other cross-sectional shapes may also be employed, as desired.

Figure 3A:
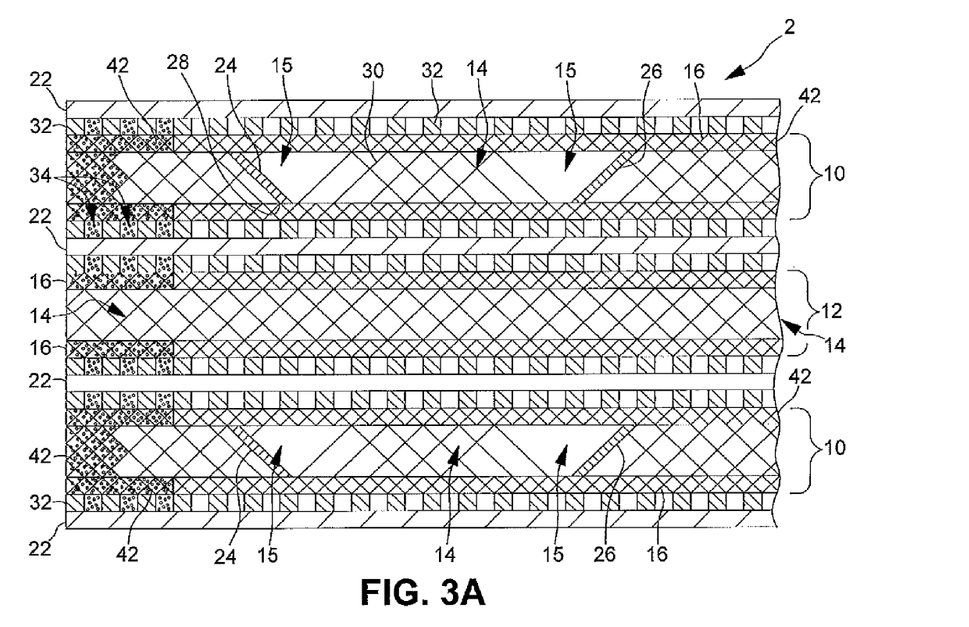
FIGS. 3A-3B are fragmentary side cross-sectional elevational views of a water vapor transport device taken along section lines A-A and B-B, respectively, in FIG. 1, further showing a support grid disposed between a microtruss structure and a membrane.
Figure 3B:
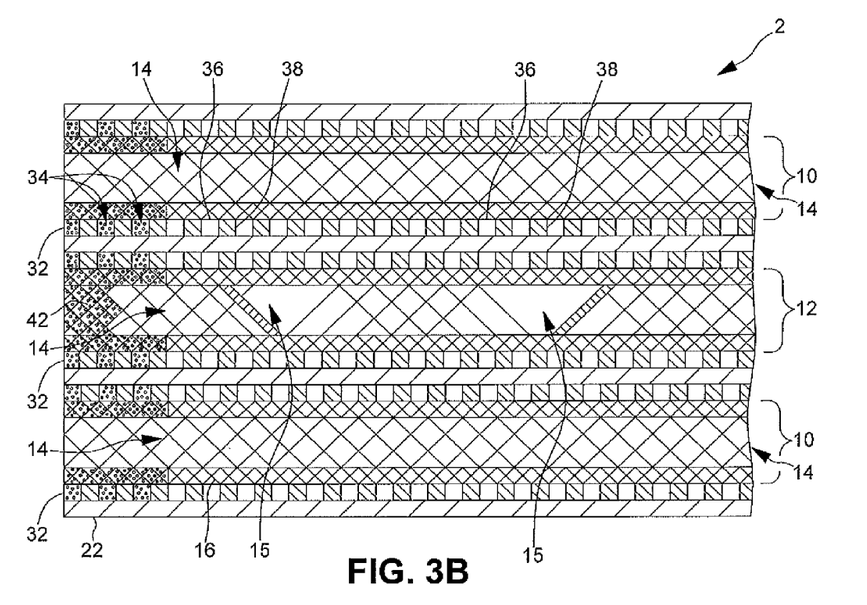

Referring now to FIGS. 3A and 3B, the water vapor transport device 2 may further include a pair of grids 32 disposed in at least one of the wet flow field layer 10 and the dry flow field layer 12. The grids 32 are disposed between one of the fine microtruss structures 16 and the membrane 22. Like the coarse and fine microtruss structures 14, 16, the grids 32 are formed from a radiation-cured material. Illustratively, the grids 32 are configured to at least one of support and militate against a degradation of the membrane 22 that might otherwise occur due to contact of the membrane 22 with the ends of the truss elements of the microtruss structure 16. As a nonlimiting example, the surface of the grids 32 may be substantially planar. In particular embodiments, the grids 32 may have a thickness from about 50 microns to about 400 microns, more particularly about 100 microns to about 200 microns, and most particularly about 150 microns. A skilled artisan may select other suitable thicknesses of the grids 32 as desired. The grids 32 may also replace the fine microtruss structures 16 such that at least one of the wet flow field layer 10 and the dry flow field layer 12 includes only the coarse microtruss structure 14 and the grids 32.

The grids 32 have a plurality of openings 34 formed therein. The openings 34 facilitate reactant distribution and water movement through the wet and dry flow field layers 10, 12. Illustratively, the grids 32 may be formed from a plurality of first walls 36 extending along a first direction and a plurality of second walls 38 extending along a second direction. The first and second walls 36, 38 may intersect to form the plurality of openings 34 in the grids 32. The first and second walls 36, 38 may form openings 34 having a quadrilateral shape, such as a square shape, rectangular shape, or diamond shape, for example. It should be appreciated that other shapes for the openings 34 may be selected, as desired.

As shown in FIGS. 2A to 3B, the water vapor transport device 2 may include at least one seal 42 that provides a substantially fluid tight seal at the peripheral edges of the water vapor transport device 2. For example, the seal 42 may be disposed at a peripheral edge of at least one of the wet flow field layer 10 and the dry flow field layer 12. The seal 42 is formed from an elastomeric material that provides a desirably compliant surface for the stacking of the components of the water vapor transport device 2. Suitable elastomeric materials include materials that do not degrade significantly with exposure to water vapor transport device 2 operation conditions, such as exposure to moisture, for example. As nonlimiting examples, the elastomeric material may include a silicone or a polyurethane. Other suitable elastomeric materials for the seal 42 may be selected as desired.

In one example, the seal 42 is formed by imbibing a portion of at least one of the wet flow field layer 10 and the dry flow field layer 12 with the elastomeric material. In a particular embodiment, the elastomeric material is a liquid elastomer that is applied by screen printing, for example, of the liquid elastomer to the desired portions of at least one of the wet and dry flow field layers 10, 12. The pore sizes of the microtruss structure 16 may be selected, for example, to provide a wicking response as the liquid elastomer is applied. It should be appreciated that the imbibing of the wet and dry flow field layers 10, 12 with the elastomeric material may include imbibing a portion of at least one of the coarse microtruss structure 14, the fine microtruss structures 16, the spaced apart support ligaments 30, and the grids 32 with the elastomeric material. In order for the wet and dry flow field layers 10, 12 to be imbibed with the elastomeric material, areas of the coarse microtruss structures 14 into which a wicking by elastomeric material is desired must be sufficiently fine to militate against an undesirable wicking of the elastomeric material out of the coarse microtruss structures 14 and into the adjacent fine microtruss structures 16.

In another example, the seal 42 is formed by molding a layer of the elastomeric material around the peripheral edges of at least one of the wet flow field layer 10 and the dry flow field layer 12. One of ordinary skill in the art should appreciate that other means for forming the seals 42 of the water vapor transport device 2 may be employed as desired.

It should be understood that following the fabrication of at least one of the radiation-cured wet flow field layer 10 and the dry flow field layer 12, at least one of the wet flow field layer 10 and the dry flow field layer 12 may be further processed to enhance a strength and an environmental resistance thereof. As nonlimiting examples, at least a portion of the water vapor transport device 2 may be metalized, ceramicized, and carbonized.

In one embodiment, at least a portion of the water vapor transport device 2 may be metalized by plating at least a portion of at least one of the wet flow field layer 10 and the dry flow field layer 12 with a metal coating. The metal coating may be substantially oxidation resistant, reduction resistant, and acid-resistant, for example. The metal coating may include a noble metal selected from the group consisting of: ruthenium (Ru), rhodium (Rh), palladium (Pd), silver (Ag), iridium (Ir), platinum (Pt), and osmium (Os), and alloys thereof, for example. In a particular embodiment, the metal coating is gold (Au). In another particular embodiment, the metal coating is tantalum (Ta). Another suitable metal coating may include nickel (Ni) alloys, such as alloys of nickel (Ni) and chromium (Cr) or nickel (Ni) and cobalt (Co). As should be recognized by one of ordinary skill in the art, the metal coating may include mixtures or alloys of the above identified metals. Other metals may also be employed, as desired.

The metal coating may be deposited onto the water vapor transport device 2 by at least one of electron beam evaporation, magnetron sputtering, physical vapor deposition, chemical vapor deposition, atomic layer deposition, electrolytic deposition, electroless deposition, flame spray deposition, brush plating, and other like processes. Solution based electroplating techniques that include immersing at least a portion of at least one of the wet flow field layer 10 and the dry flow field layer 12 in a plating bath may also be employed. Application of metal in the form of a slurry powder and subsequently firing the slurry powder to form the metal coating may also be used. A skilled artisan may select more than one deposition technique to take into account differences between line of sight and non-line of sight characteristics of the deposition techniques selected. In certain embodiments, the metal coating may be substantially evenly deposited on both the interior and exterior surfaces of the radiation-cured structure. Suitable means for metalizing at least a portion of at least one of the wet flow field layer 10 and the dry flow field layer 12 may be selected as desired.

One of ordinary skill in the art should understand that at least a portion of at least one of the wet flow field layer 10 and the dry flow field layer 12 structure may be carbonized, as desired. Open-cellular carbon structures and a method of making the same from a polymer template material is disclosed by Jacobsen in U.S. patent application Ser. No. 11/870,379, the disclosure of which is hereby incorporated herein by reference in its entirety. Other suitable methods for carbonizing at least a portion of at least one of the wet flow field layer 10 and the dry flow field layer 12 may also be used.

It should be appreciated that at least a portion of the water vapor transport device 2 may be ceramicized by coating at least a portion of at least one of the wet flow field layer 10 and the dry flow field layer 12 with a suitable metal oxide or ceramic. In certain illustrative embodiments, at least a portion of at least one of the wet flow field layer 10 and the dry flow field layer 12 may be coated with the metal oxide or the ceramic to provide a desirable level of bending strength. Suitable ceramic structures and methods for ceramicizing radiation-cured structures are disclosed by Gross et al. in U.S. patent application Ser. No. 12/074,727, the entire disclosure of which is hereby incorporated herein by reference. Other suitable methods for ceramicizing at least a portion of at least one of the wet flow field layer 10 and the dry flow field layer 12 may also be used.

The ability to control the porosity through the thickness and in patterns across the area in wet and dry flow field layers 10, 12 allows for performance optimization as compared to commercially available materials. The complexity of the water vapor transport device 2, particularly in relation to the number of components for construction of the water vapor transport device 2, is also minimized by combining the flow distribution, sealing, porting, and membrane support functions as disclosed herein.

It is further surprisingly found that the water vapor transport device 2 of the present disclosure maintains mechanical strength and stability in relation to creep, thermal expansion, and hydro expansion of the membrane 22 during operation of the water vapor transport device 2. Desirably, the water vapor transport device 2 of the present disclosure exhibits through-plane stiffness sufficient to facilitate expansion of the membrane 22 during operation of the water vapor transport device 2.

While certain representative embodiments and details have been shown for purposes of illustrating the invention, it will be apparent to those skilled in the art that various changes may be made without departing from the scope of the disclosure, which is further described in the following appended claims.

What is claimed is:

1. A fuel cell system, comprising:
a fuel cell having an electrolyte membrane disposed between a pair of electrodes, a pair of diffusion medium layers, and a pair of electrically conductive fuel cell plates, the electrodes configured to receive a humidified fluid; and
a water vapor transport device in fluid communication with the fuel cell, the water vapor transport device including a wet flow field layer having a coarse microtruss structure disposed between a pair of fine microtruss structures, the wet flow field layer formed from a radiation-sensitive material and adapted to facilitate a flow of a wet fluid therethrough, a dry flow field layer having a coarse microtruss structure disposed between a pair of fine microtruss structures, the dry flow field layer formed from a radiation-sensitive material and adapted to facilitate a flow of a dry fluid therethrough, and a membrane disposed between the wet flow field layer and the dry flow field layer, the membrane adapted to permit a transfer of water vapor therethrough from the wet fluid to the dry fluid.

2. The fuel cell system of claim 1, wherein each of the microtruss structures includes a plurality of first truss elements extending along a first direction, a plurality of second truss elements extending along a second direction, and a plurality of third truss elements extending along a third direction.

3. The fuel cell system of claim 1, wherein at least one of the wet flow field layer and the dry flow field layer includes a plurality of flow channels and a spatial density of the microtruss structures is less than a spatial density of the plurality of flow channels.

4. The fuel cell system of claim 1, wherein at least one of the wet flow field layer and the dry flow field layer includes a plurality of flow channels and the plurality of flow channels includes a plurality of first channel walls extending along one direction.

5. The fuel cell system of claim 4, wherein the plurality of flow channels includes a plurality of second channel walls extending along another direction, wherein the plurality of first channel walls and the plurality of second channel walls interpenetrate each other at a plurality of junctions to form the plurality of flow channels.

6. A fuel cell system, comprising:
a fuel cell having an electrolyte membrane disposed between a pair of electrodes, a pair of diffusion medium layers, and a pair of electrically conductive fuel cell plates, the electrodes configured to receive a humidified fluid; and
a water vapor transport device in fluid communication with the fuel cell, the water vapor transport device including a wet flow field layer having a coarse microtruss structure disposed between a pair of fine microtruss structures, the wet flow field layer formed from a radiation-sensitive material and adapted to facilitate a flow of a wet fluid therethrough, a dry flow field layer having a coarse microtruss structure disposed between a pair of fine microtruss structures, the dry flow field layer formed from a radiation-sensitive material and adapted to facilitate a flow of a dry fluid therethrough, and a membrane disposed between the wet flow field layer and the dry flow field layer, the membrane adapted to permit a transfer of water vapor therethrough from the wet fluid to the dry fluid, wherein at least one of the wet flow field layer and the dry flow field layer includes a pair of grids, one of the grids disposed between one of the microtruss structures and the membrane.

7. The fuel cell system of claim 6, wherein each of the grids includes a plurality of first walls extending along a first direction and a plurality of second walls extending along a second direction.

8. The fuel cell system of claim 1, wherein a peripheral edge of at least one of the wet flow field layer and the dry flow field layer has a seal.

9. The fuel cell system of claim 8, wherein the seal is formed by imbibing a portion of the microtruss structures with an elastomer.

10. The fuel cell system of claim 8, wherein the seal is formed by molding an elastomer over the peripheral edge.

11. The fuel cell system of claim 1, where at least one of the wet flow field layer and the dry flow field layer includes a plurality of flow channels and a plurality of spaced apart support ligaments disposed between the microtruss structures and that are adapted to support at least one wall forming the flow channels.

12. The fuel cell system of claim 1, wherein at least a portion of at least one of the wet flow field layer and the dry flow field layer is one of metalized, ceramicized, and carbonized.

13. The fuel cell system of claim 1, wherein at least one of the wet flow field layer and the dry flow field layer includes a plurality of flow channels in the coarse microtruss structure that do not enter the pair of fine microtruss structures.

* * * * *